United States Patent [19]

Sakurai et al.

[11] 3,856,132
[45] Dec. 24, 1974

[54] APPARATUS FOR CONVEYING SHEET MATERIALS

[75] Inventors: Masayuki Sakurai, Tokyo; Syozo Takahashi; Hideo Kikuno, both of Yokohama, all of Japan

[73] Assignee: Tokyo Shibaura Electric Co., Ltd., Saiwai-ku, Kawasaki-shi, Japan

[22] Filed: July 7, 1972

[21] Appl. No.: 269,578

[30] Foreign Application Priority Data
July 8, 1971  Japan.............................. 46-59816

[52] U.S. Cl............. 198/30, 198/285, 198/DIG. 16, 271/34, 271/275
[51] Int. Cl............................. B65g 47/30
[58] Field of Search ............ 271/51, 52, 69, DIG. 9, 271/34, 35, 264, 272, 275, 184; 198/DIG. 16, 33 R, 33 AA, 25, 165, 30, 282, 285, 268

[56] References Cited
UNITED STATES PATENTS

| 2,662,632 | 12/1953 | Black et al........................ 198/33 R |
| 2,757,779 | 8/1956 | McKune.......................... 198/165 X |
| 3,012,775 | 12/1961 | Buslik et al........................... 271/52 |
| 3,199,864 | 8/1965 | Irvine................................... 271/51 |
| 3,347,348 | 10/1967 | Flint et al. ...................... 271/10 X |

FOREIGN PATENTS OR APPLICATIONS
711,840  7/1954  Great Britain................ 198/DIG. 16

*Primary Examiner*—Richard A. Schacher
*Assistant Examiner*—Bruce H. Stoner, Jr.
*Attorney, Agent, or Firm*—Kemon, Palmer & Estabrook

[57] ABSTRACT

In apparatus for conveying sheet materials of the type including means for reversing the direction of movement of the sheet materials while they are being conveyed, there are provided a vertical rotary drum, a guide frame disposed about one half of the periphery of the rotary drum to define a gap therebetween extending in parallel with the periphery of the rotary drum, a rotary table extending outwardly from the lower end of the rotary drum to close the bottom of the gap, a supply conveyor driven in the same direction as the rotary table for conveying the sheet materials in the upright condition, said supply conveyor having a discharge end disposed close to the entrance end of the guide frame, and a take off conveyor driven in the same direction as the rotary table for conveying the sheet materials discharged from the gap in the upright condition, the take off conveyor having an inlet end disposed close to the discharge end of the gap, the gap reversing the direction of movement of the sheet materials while they are conveyed therethrough and having a radial width sufficient to permit overlapping of a plurality of sheet materials while they are conveyed through the gap.

4 Claims, 3 Drawing Figures

PATENTED DEC 24 1974 3,856,132

APPARATUS FOR CONVEYING SHEET MATERIALS

This invention relates to apparatus for conveying sheet materials, for example, postal matters such as envelopes, post cards or the like, more particularly to apparatus including a mechanism for temporarily storing or buffering surplus sheet materials and for reversing the direction of conveyance thereof.

In an automatic sorting machine of postal matters, the postal matters supplied to the machine are sorted or classified while they are conveyed through the machine so that when various sorting sections are arranged on a straight line, the length of the sorting machine is increased. For this reason, in order to decrease the length of the machine, the machine is usually provided with a device for changing the direction of conveyance. Such a device for changing the direction of conveyance generally comprises a plurality of guide rollers for guiding a conveyor belt to pass along an arcuate passage. Use of a plurality of rollers not only complicates the construction but also requires a large space.

Since various processing devices disposed between a series of conveyor means have different instantaneous processing capacities due to the difference in their processing speeds and to the interruptions of their operations the processing capacity of a preceding processing device often exceeds that of a succeeding processing device. In such a case, a buffer or store device is installed between adjacent processing devices for temporarily storing surplus postal matters.

It is an object of this invention to provide an improved apparatus for conveying sheet materials capable of reversing the direction of conveyance and for providing the desired storing action to the succeeding device or a take off conveyor.

Another object of this invention is to provide an improved apparatus for reversing the direction of movement of the sheet materials while they are being conveyed and including means for throwing down elongated rectangular sheet materials such as post cards and envelopes so as to cause them to stand upright on their longer sides.

Still another object of this invention is to provide an improved apparatus for conveying a plurality of sheet materials capable of separating from each other a plurality of sheet materials and of conveying them, one after one, even when they are fed in an overlapped condition.

In accordance with this invention, there is provided apparatus for conveying sheet materials of the type including means for reversing the direction of movement of the sheet materials while they are being conveyed, characterized in that there are provided a vertical rotary drum, a guide frame disposed about one half of the periphery of the rotary drum to define a gap therebetween extending in parallel with the periphery of the rotary drum, a rotary table outwardly extending from the lower end of the rotary drum to close the bottom of the gap, a supply conveyor driven in the same direction as the direction of rotation of the rotary table for conveying the sheet material in the upright condition, said supply conveyor having a discharge end disposed close to the entrance end of the guide frame, and a take off conveyor driven in the same direction as the direction of rotation of the rotary table for conveying the sheet materials discharged from the gap in the upright condition, the take off conveyor having an inlet end disposed close to the discharge end of the gap, said gap reversing the direction of movement of the sheet materials while they are conveyed therethrough and having a radial width sufficient to permit overlapping of a plurality of sheet materials while they are conveyed through the gap.

There is also provided means above the gap and near the entrance end thereof for throwing down rectangular sheet materials to cause them to stand upright on their longer sides.

This invention can be more fully understood from the following detailed description taken in conjunction with the accompanying drawings, in which.

Figure 1:
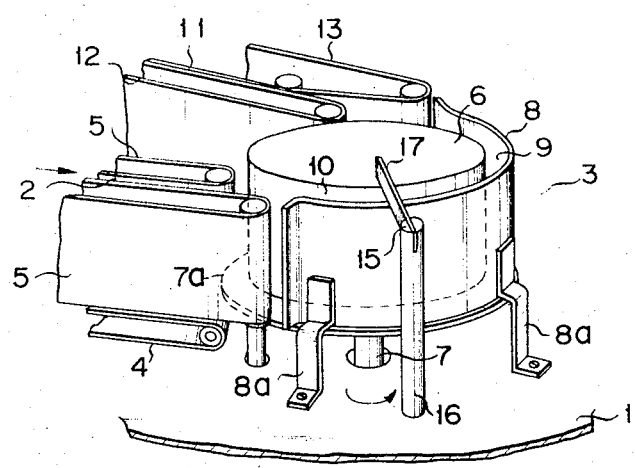
FIG. 1 shows a perspective view of the apparatus for conveying sheet materials constructed according to the teaching of the invention.
Figure 2:
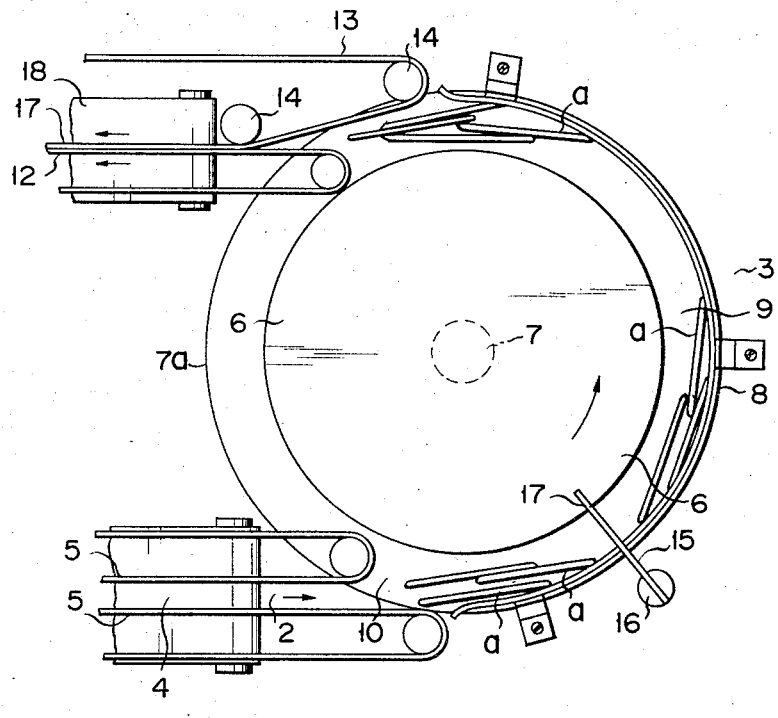
FIG. 2 is a plan view of the apparatus shown in FIG. 1.
Figure 3:
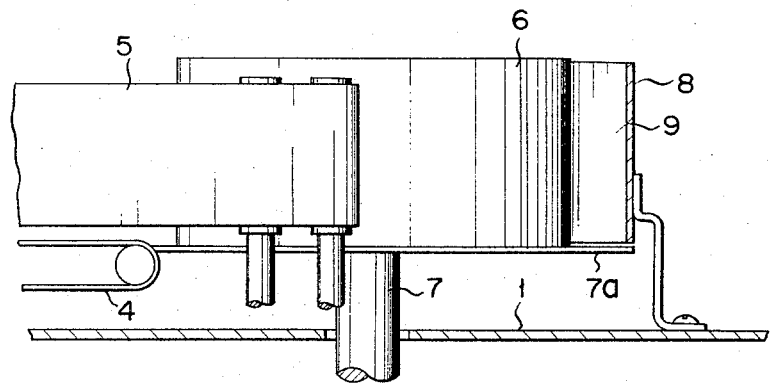
FIG. 3 shows a side elevation, partly in section, of the apparatus shown in FIG. 1.

A preferred embodiment of the apparatus for conveying postal matters shown in the accompanying drawings comprises a base plate 1 for supporting an upright conveyor 2, that is a conveyor for conveying the postal matters to be classified in their upright states. Although not shown in the drawing various sorting devices are provided along the conveyor 2 for removing postal matters having sizes or stiffnesses other than those prescribed. The upright conveyor 2 comprises a lower endless belt 4 passing around rollers and a pair of side endless belts 5 also passing around rollers, and positioned to overlie the lower belt 4. These belts cooperate to convey postal matters while maintaining them upright. In order to decrease the size and length of the apparatus the conveyor 2 is combined with apparatus 3 for reversing the direction of conveyance. The direction reversing apparatus 3 comprises a vertical rotary drum 6 with its driving shaft 7 extended through the base plate 1 to be driven in the direction shown by an arrow by a suitable driving device, not shown. A circular disc shaped rotary table 7a is integrally mounted to the lower end of the rotary drum 6 to radially extend therefrom in the horizontal direction. Thus, the rotary table 7a rotates together with the rotary drum 6. A sheet of high coefficient of friction such as a rubber sheet, not shown, is bonded to the peripheral surface of the rotary drum 6. A semicircular guide frame 8 is supported on the base plate 1 by means of a plurality of legs 8a to surround about one half of the periphery of the rotary drum 6 to define an arcuate gap 9 for guiding the postal matters. The guide frame 8 is positioned in concentric relation with the rotary drum 6. Further the guide frame 8 is slightly spaced apart from the rotary table 7a. The width of the gap 9 defined by rotary drum 6, rotary table 7a and guide frame 8 is selected such that it can convey at least several overlapped postal matters. As shown in FIG. 2, the inner operating surface of the outer side belt 5 is substantially continuous with the inner surface of the guide frame 8. The right-hand end of the side belt 5 is terminated at the entrance end 10 of the gap 9 so that several randomly overlapped postal matters a can enter the gap. At the outlet end of the gap 9 there is provided a take off mechanism or a conveyor 11 which is constructed to convey, one after one, the postal matters a conveyed through the gap 9 to the succeeding upright conveyors, not shown. As shown in FIG. 2, the conveyor 11 comprises a lower endless belt 18 and a pair of upright endless side belts 12 and 13 which are disposed to run along the upper surface of the lower belt 18 at different speeds. For example, the running speed of the outside side belt 13 is 0.3m/sec., whereas that of the inside side belt 12 is 1.5m/sec. On the other hand, the running speeds of the upright conveyor 2 and rotary table 7 at the gap 9 are selected to be about 1.0m/sec. As shown in FIG. 2, the inner operating surface of the outer side belt 13 constitutes a substantially continuous guide surface to the outlet end of the guide frame 8. The entrance to the passage between contacting runs of the inside and outside side belts 12 and 13 is formed in the form of a letter V by passing the belt 13 over a guide roller 14. Above the entrance side of the gap 9 is positioned a postal matter throw down device 15 which may be of any well known construction. In the example shown, the thrown down device comprises an upright post 16 secured to the base plate 1 and a leaf spring 17 mounted on the upper end of post 16 to project horizontally above the gap 9.

In operation, postal matters $a$ are continuously fed into gap 9 from the upright conveyor 2. While being conveyed through gap 9, the direction of movement of the postal matters $a$ is reversed and they are successively overlapped in the gap 9 beginning from the outlet end thereof. More particularly, the postal matters $a$ which come to contact the guide frame 8 while they are conveyed by the rotary table 7a are more or less decelerated. On the other hand the postal matters $a$ that come to contact the periphery of the rotary drum 6 are dragged in the direction of conveyance by the frictional engagement. Thus, the rotary drum 6 and the guide frame 8 cooperate with each other to slightly displace from each other the overlapped postal matters $a$ in the gap 9. By the rotary inertia imparted by the rotary drum 6, the postal matters $a$ at the outlet end of the gap 9 are urged toward the entrance to the take off conveyor 11 so that these postal matters are clamped, one after one, between side belts 12 and 13. Since these side belts are operated at different running speeds, at first even when two or more postal matters are clamped between them the postal matters are separated from each other. More specifically, the postal matter in contact with inside side belt 12 will be advanced with respect to the postal matter in contact with the outside side belt 13 driven at a lower speed than the inside side belt 12. Thus, before they reach the exit end of the take off conveyor, these overlapping postal matters are completely separated. Although not shown in the drawing, the belts 12 and 13 are slightly separated at the discharge end so that the separated postal matters can be taken out or processed independently.

Where the postal matters $a$ take the form of an elongated rectangle and are brought into the gap 9 with their longer sides at right angles with respect to the direction of conveyance, they are thrown down by leaf spring 17 to lie on the rotary table 7a. Furthermore, by the centrifugal force imparted by the rotary drum 6, the postal matters fed into the gap 9 are urged radially against the inner surface of the guide frame 8 and since the postal matters are mounted on the rotary table, the postal matters of the elongated rectangular shape will be thrown down on the table with their longer side lying thereon.

With the conveyor device constructed as above described, the postal matters of the number exceeding the take off capacity of the take off conveyor 11 are temporarily stored in the gap 9 having buffering action so that even if the postal matters are supplied nonuniformly, it is possible to discharge, one after one, and at a regular spacing, the postal matters from the discharge end of the take off conveyor 11. Moreover, as the gap 9 is defined by rotary drum 4, rotary table 7 and guide frame 8, its construction is extremely simple and its radius of curvature can be made relatively small.

In this manner, the gap 9 functions as a buffer or a storeroom for temporarily storing the postal matters which have been fed thereinto intermittently or in excess. More over, the direction of movement of the postal matters is reversed while they are conveyed through the gap 9, it is possible to shorten the overall length and reduce the space required for the processing apparatus.

What we claim is:

1. Apparatus for conveying sheet materials comprising a vertical rotary drum, a guide frame disposed about one half of the periphery of said rotary drum to define a gap therebetween extending in parallel with the periphery of said rotary drum, a rotary table extending outwardly from the lower end of said rotary drum to close the bottom of said gap, a supply conveyor driven in the same direction as the direction of rotation of said rotary table for conveying said sheet materials in the upright condition, said supply conveyor having a discharge end disposed close to the entrance end of said guide frame, and a takeoff conveyor driven in the same direction as the direction of rotation of said rotary table for conveying said sheet materials discharged from said gap in the upright condition, said takeoff conveyor having an inlet end disposed close to the discharge end of said gap and comprising an outside belt having an inner surface disposed in substantially the same plane as the inner surface of said guide frame at the exit end thereof and an inside belt driven in the same direction at a higher speed as said outside belt, said outside and inside belts cooperating to take off, one after one, said sheet materials discharged from said gap, said gap reversing the direction of movement of said sheet materials while they are conveyed therethrough and having a radial width sufficient to permit overlapping of a plurality of sheet materials for the sake of temporarily buffering them while they are conveyed therethrough in the upright condition.

2. The apparatus according to claim 1 wherein said rotary drum has a peripheral surface having a large coefficient of friction.

3. The apparatus according to claim 1 wherein said supply conveyor comprises an outside belt having an inner surface disposed in substantially the same plane as the inner surface of said guide frame at the entrance end thereof and an inside belt driven in the same direction as said outside belt.

4. Apparatus for conveying sheet materials comprising a vertical rotary drum, a guide frame disposed about one half of the periphery of said rotary drum to define a gap therebetween extending in parallel with the periphery of said rotary drum, a rotary table extending outwardly from the lower end of said rotary drum to close the bottom of said gap, a supply conveyor driven in the same direction as the direction of rotation of said rotary table for conveying said sheet materials in the upright condition, said supply conveyor having a discharge end disposed close to the entrance end of said guide frame, and a takeoff conveyor driven in the same direction as the direction of rotation of said rotary table for conveying said sheet materials discharged from said gap in the upright condition, said takeoff conveyor having an inlet end disposed close to the discharge end of said gap, means for throwing down sheet materials conveyed through said gap comprising a leaf spring positioned above said gap near the entrance thereto, said leaf spring releasing said sheet materials in the direction of conveyance when subjected to a pressure exceeding a predetermined value, said gap reversing the direction of movement of said sheet materials while they are conveyed therethrough and having a radial width sufficient to permit overlapping of a plurality of sheet materials while they are conveyed therethrough in the upright condition.

* * * * *